(12) United States Patent
Hay et al.

(10) Patent No.: US 10,541,970 B2
(45) Date of Patent: Jan. 21, 2020

(54) METHOD AND SYSTEM FOR PROVIDING DEEP PACKET INSPECTION AS A SERVICE

(71) Applicants: Yissum Research Development Company of The Hebrew University of Jerusalem Ltd., Jerusalem (IL); Anat Brembler-Barr, Ramat Hasharon (IL)

(72) Inventors: David Hay, Tel Aviv (IL); Yaron Koral, Hod Hasharon (IL); Yotam Harchol, Moshav Balfuria (IL); Anat Brembler-Barr, Ramat Hasharon (IL)

(73) Assignee: Yissum Research Development Company of The Hebrew University of Jerusalem Ltd., Jerusalem (IL)

( * ) Notice: Subject to any disclaimer, the term of this patent is extended or adjusted under 35 U.S.C. 154(b) by 0 days.

(21) Appl. No.: 15/321,472

(22) PCT Filed: Jun. 23, 2015

(86) PCT No.: PCT/IL2015/050641
§ 371 (c)(1),
(2) Date: Dec. 22, 2016

(87) PCT Pub. No.: WO2015/198316
PCT Pub. Date: Dec. 30, 2015

(65) Prior Publication Data
US 2017/0208037 A1    Jul. 20, 2017

Related U.S. Application Data

(60) Provisional application No. 62/015,588, filed on Jun. 23, 2014.

(51) Int. Cl.
*H04L 29/06* (2006.01)

(52) U.S. Cl.
CPC ...... *H04L 63/0245* (2013.01); *H04L 63/1416* (2013.01)

(58) Field of Classification Search
CPC .................. H04L 63/0245; H04L 63/1416
(Continued)

(56) References Cited

U.S. PATENT DOCUMENTS

2010/0199348 A1    8/2010    Sahni et al.
2010/0309794 A1*  12/2010    Keynan ............... H04L 41/0896
                                                        370/252

(Continued)

OTHER PUBLICATIONS

Margaret Chiosi et al.: "Network Functions Virtualization—Introductory White Paper Issue 1 Network Functions Virtualization an Introduction, Benefits, Enablers, Challenges & Call for Action Contributing Organisations & Authors", Oct. 22, 2012, Retrieved from the Internet: http://www.tid.es/es/Documents/NFV_White_PaperV2.pdf.

(Continued)

*Primary Examiner* — Kambiz Zand
*Assistant Examiner* — Benjamin A Kaplan
(74) *Attorney, Agent, or Firm* — Pearl Cohen Zedek Latzer Baratz LLP

(57) ABSTRACT

A method and system for providing Deep Packet Inspection (DPI) as a service to a computer network are provided herein. The contribution of embodiments of the present invention is two-folded. First, a possible framework of having DPI deployed as a service is detailed, including the necessary algorithms and required adaptations. Second, the superior performance of the suggested design is demonstrated via simulations. Since the focus is on the algorithmic aspects and network design, an SDN implementation of the suggested design is not provided herein. However, many aspects of such an SDN implementation follow closely the guidelines known in the art.

16 Claims, 8 Drawing Sheets

(58) Field of Classification Search
USPC .......................................................... 726/13
See application file for complete search history.

(56) References Cited

U.S. PATENT DOCUMENTS

| | | |
|---|---|---|
| 2012/0243547 A1 | 9/2012 | Pardo-Blazquez et al. |
| 2013/0254197 A1* | 9/2013 | Hay .................. G06F 17/30861 707/736 |
| 2014/0181267 A1* | 6/2014 | Wadkins ............... H04L 69/163 709/219 |

OTHER PUBLICATIONS

Padmashani R. et al.: "BSnort IPS Better Snort Intrusion Detection/Prevention System", Intelligent Systems Design and Applications (ISDA), 2012 12$^{th}$ International Conference on, IEEE, Nov. 27, 2012, pp. 46-51.

Seyed Kaveh Fayazbakhsh et al.: "Verifiable network function outsourcing: Requirements, Challenges and Roadmap", Proceedings of the 2013 Workshop on Hot Topics in Middleboxes and Network Function Virtualization, Hotmiddlebox '13, Dec. 9, 2013, pp. 25-30.

Anat Bremler-Barr et al.: "Space-time tradeoffs in software-based deep packet Inspection", High Performance Switching and Routing (HPSR), 2011 IEEE 12$^{th}$ International Conference on, IEEE, Jul. 4, 2011, pp. 1-8.

International Search Report of PCT Application No. PCT/IL2015/050641, dated Oct. 16, 2015.

* cited by examiner

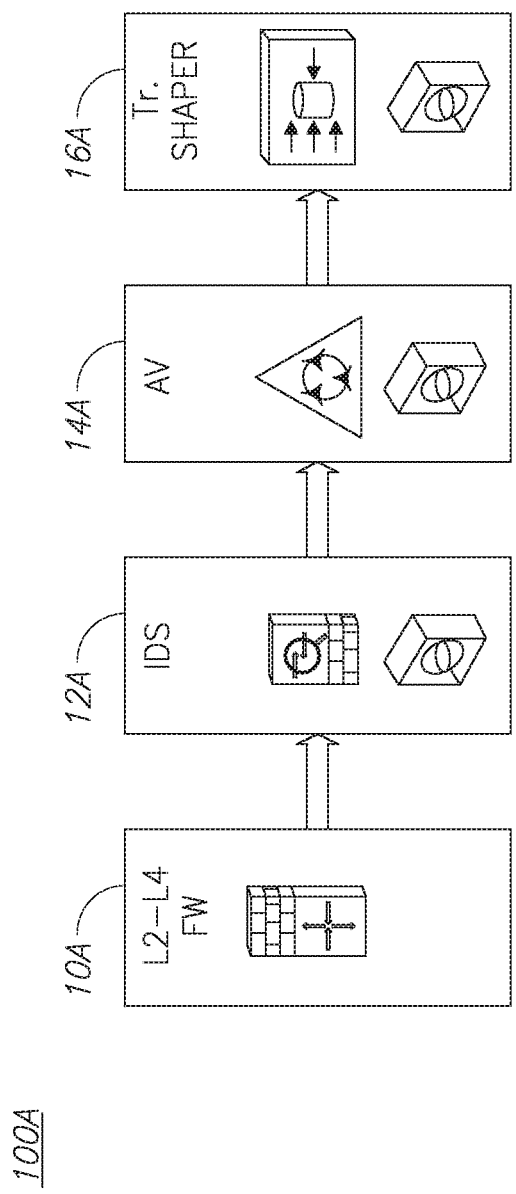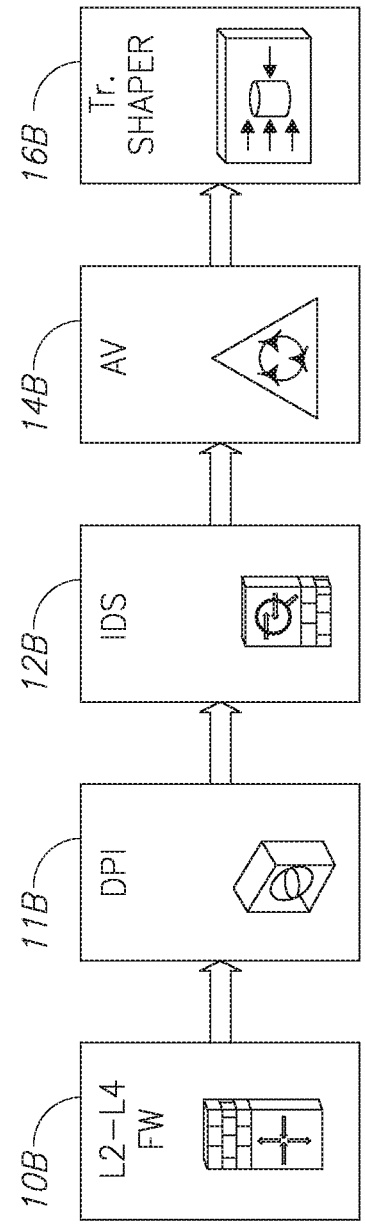

METHOD AND SYSTEM FOR PROVIDING DEEP PACKET INSPECTION AS A SERVICE

CROSS-REFERENCE TO RELATED APPLICATIONS

This application is a National Phase Application of PCT International Application No. PCT/IL2015/050641, International Filing Date Jun. 23, 2015, entitled: "METHOD AND SYSTEM FOR PROVIDING DEEP PACKET INSPECTION AS A SERVICE", published on Dec. 30, 2015 as International Patent Application Publication No. WO 2015/198316, claiming the benefit of U.S. Provisional Patent Application No. 62/015,588, filed Jun. 23, 2014, which is hereby incorporated by reference in its entirely.

FIELD OF THE INVENTION

The present invention relates generally to the field of computer network communication and in particular to systems and methods for inspecting the content of compressed data transferred over computer networks.

BACKGROUND OF THE INVENTION

Prior to setting forth a short discussion of the related art, it may be helpful to set forth definitions of certain terms that will be used hereinafter.

The term "Open Systems Interconnection model" (OSI Model) refers herein to a conceptual model that characterizes and standardizes the communication functions of a telecommunication or computing system without regard of their underlying internal structure and technology. Its goal is the interoperability of diverse communication systems with standard protocols. The model partitions a communication system into abstraction layers. The original version of the model defined seven layers. As referred herein, L7 denotes Applications Layer; L6 denotes Presentation Layer L5 denotes Session Layer; L4 denotes Transport Layer; L3 denotes Network Layer; L2 denotes Link Layer; and L1 denotes Physical Layer.

The term "middlebox" refers herein to a computer networking device that transforms, inspects, filters, or otherwise manipulates traffic for purposes other than packet forwarding. Common examples of middleboxes include firewalls which filter unwanted or malicious traffic, and network address translators, which modify packets' source and destination addresses. Dedicated middlebox hardware is widely deployed in enterprise networks to improve network security and performance; however, even home network routers often have integrated firewall, NAT, or other middlebox functionality.

The term "Deep Packet Inspection" (DPI), also called "complete packet inspection" and "Information eXtraction" (IX) refers herein to a form of computer network packet filtering that examines the data part (and possibly also the header) of a packet as it passes an inspection point, searching for protocol non-compliance, viruses, spam, intrusions, or defined criteria to decide whether the packet may pass or if it needs to be routed to a different destination, or, for the purpose of collecting statistical information.

The term "Software-defined networking" (SDN) refers herein to an approach in computer networking that allows network administrators to manage network services through abstraction of lower-level functionality. This is done by decoupling the system that makes decisions about where traffic is sent (the control plane) from the underlying systems that forward traffic to the selected destination (the data plane).

In contemporary networks, middleboxes play a major role as often forwarding packets is not enough to meet operators demands and other functionalities (such as security, QoS/QoE provisioning, and load balancing) are required. Traffic is usually routed through a sequence of such middleboxes, which either reside across the network or in a single, consolidated location. Although middleboxes provide a vast range of capabilities, there are components that are shared among many of them.

A prime example that is common to almost all middleboxes that deal with L7 protocols is Deep Packet Inspection (DPI). Today, traffic is inspected from scratch by all the middleboxes on its route.

Over the last few years, a great effort was invested in redesigning middleboxes' architecture. In traditional networks, middleboxes are placed at strategic places along the traffic path, which are determined by the network topology; traffic is going through the middleboxes as dictated by the regular routing mechanism. SDN makes it possible to perform traffic steering, where routing through a chain of middleboxes is determined using a middlebox-specific routing considerations that might differ significantly from traditional routing schemes.

Recently, telecommunication vendors launched the Network Functions Virtualization (NFV) initiative that aims to virtualize network appliances at the operator. The main objective of NFV is to reduce the operational costs of these appliances (which are traditionally implemented in middleboxes) by obtaining the same functionality in software that runs on commodity servers. NFV provides an easier management and maintenance by eliminating the need to deal with multiple hardware types and vendors; moreover, as NFV is implemented in software, it promotes innovation in this domain DPI is the most significant example of an appliance or functionality that may be virtualized. Moreover, as most suggestions for NFV operate in a distributed private cloud, leveraging traffic repetitions for high-speed DPI will be very beneficial due to the locality in the traffic at different vantage points at the operator.

There are several pioneer works about middlebox virtualization. One example provides a mechanism to place a middlebox, such as the Bro NIDS, in a virtual environment, where the virtual machine (VM) might migrate between different machines. Another example deals with standardization of a unified control to middleboxes, inspired by the SDN paradigm. Nevertheless, virtualizing middleboxes raises several issues that should be carefully dealt with, such as efficient fault tolerance, availability, and management.

A different approach to tackle the problem raised by managing multiple middleboxes is to offer a consolidated solution consisting of a single hardware that consolidates multiple middleboxes.

To reduce the high equipment and operating costs of middleboxes, there were several suggestions to outsource the middlebox functionalities as a service received by an entity outside the network.

It is noted that while DPI is a significant component in many middleboxes, those which focus on L4-L2 lower layers (e.g., NAT or L3 Load Balancer) are not using it, as they work only on the packet header rather than its payload.

As SDN in general include header rewriting, there is a trend to move such tasks from dedicated middleboxes to the SDN data plane and implement more sophisticated functionality as an application at the SDN controller. Most L7 middleboxes, on the other hand, use DPI to some extent.

DPI lies at the core of many middlebox applications (see Table 1), and is based on pattern matching, in which the payload of the packet is compared against a predetermined Middlebox DPI signatures.

TABLE 1

| Middlebox | DPI signatures | Example |
| --- | --- | --- |
| Intrusion Detection System | Malicious activity | SNORT, BRO |
| Anti-Virus/SPAM | Malicious activity | ClamAV |
| L7 Firewall | Malicious activity | Linux L7-filter, ModSecurity |
| L7 Load Balancing | Apps/URLs | F5, A10 |
| Leakage Prevention System | Leakage activity | Check Point DLP |
| Network Analytic | Interesting information | Qosmos |
| Traffic Shaper | Applications | Blue Coat, PacketShapper |

String matching is an essential building block of most contemporary DPI engines. In many implementations, even if most patterns are regular expressions, string matching is performed first (namely, as a pre-filter) and it consists of most of the work performed by the engine. Specifically, Snort extracts the strings that appeared in the regular expressions (called anchors). Then, string matching is performed over these anchors, and if all anchors originating from a specific regular expression are matched, then a regular expression matching of the corresponding expression is performed.

This is a common procedure since regular expression engines work inefficiently on a large number of expressions. Specifically, there are two common solutions to represent regular expressions: a Deterministic Finite Automata (DFA) or Nondeterministic Finite Automata (NFA). The DFA suffers from memory explosion especially when combining a few expressions into one data structure, while the NFA suffers from a large penalty in time.

As for (multiple) string matching, the classic algorithms are of Aho-Corasick and Wu-Manber, where the Aho-Corasick (AC) algorithm is the de-facto standard for contemporary network intrusion detection systems (NIDS). It matches multiple strings simultaneously by first constructing a DFA that represents the signatures set; then, with this DFA on its disposal, the algorithm scans the text in a single pass.

Specifically, the DFA construction is done in two phases. First, a tree of the strings is built, where strings are added one by one from the root as chains (each node in the tree corresponds to a DFA state). When signatures share a common prefix, they also share the corresponding set of states in the tree. The edges of the first phase are called forward transitions. In the second phase, additional edges deal with situations where, given an input symbol b and a state s, there is no forward transition from s using b. Let the label of a state s, denoted by L(s), be the concatenation of symbols along the path (of forward transition) from the root to s. Furthermore, let the depth of a state s be the length of the label L(s).

The transition from s given symbol b is to a state s0, whose label L(s0) is the longest suffix of L(s)b among all other DFA states. For example, FIG. 2 depicts a DFA 200 that was constructed for signatures set {E,BE,BD,BCD, BCAA,CDBCAB}.

The DFA is traversed starting from the root. Traversing to an accepting state indicates that some signatures are a suffix of the input; one of these signatures always corresponds to the label of the accepting state. The correctness of the AC algorithm essentially stems from the following simple property:

Property 1

Let b1, . . . , bn be the input, and let s0, . . . , sn be the sequence of states the AC algorithm goes through, after scanning the symbols one by one (s0 is the root of the DFA).

For any i 2 {1, . . . , n}, L(si) is a suffix of b1, . . . , bi; furthermore, it is the longest such suffix among all other states of the DFA.

The most common approach to store the DFA in memory is as a full-table AC, whose rows correspond to states and columns to symbols. Cell (i, j) holds the next state given that the current state is $s_i$ and the symbol is $b_j$. This approach is fast (under normal traffic) since only one read-operation is required for each input byte. Albeit, its memory footprint is large, leading to several memory representations that trade time with memory.

There is an extensive research on accelerating the DPI process, both in hardware and in software. Most software-based solutions accelerate the DPI process by optimizing its underlying data structure (namely, its DFA).

SUMMARY OF THE INVENTION

Nowadays traffic goes through a chain of middleboxes before reaching its destination. This implies that traffic is scanned over and over again by middleboxes with a DPI component as shown in FIG. 1A where policy chain 100A may include firewall 10A, IDS 12A, anti-virus module 14A and traffic shaper 16A. Alternatively, an opposite trend is to consolidate middleboxes in a single location (or even a hardware device). Yet, the different components of this consolidated middlebox perform DPI separately, from scratch.

Embodiments of the present invention, on the other hand, call for a single DPI scan per packet as seen in FIG. 1B where policy chain 100B may include, a DPI as a service module 11B, in addition to firewall 10B, IDS 12B, anti-virus module 14B and traffic shaper 16B. It should be noted that having many DPI service instances deployed over the network is envisioned, thus avoiding concentrating the traffic in a single location. Nevertheless, each packet will go through a single DPI service instance.

DPI as a service may be placed also inside a consolidated solution and improve the overall performance of the DPI. It should be noted that in such a case, several parts of embodiments of the present invention (such as message passing and routing between middleboxes) may be eliminated; yet, it is believed that only non-consolidated solutions, based on virtualization, can provide the desired flexibility and the ability of rapid innovation in middleboxes.

Inspired by current suggestions for Network Function Virtualization (NFV) and the flexible routing capabilities of Software Defined Networks (SDN), embodiments of the present invention suggest finding common tasks among middleboxes and offering these tasks as a service.

According to embodiments of the present invention it is suggested to treat DPI as a service to the middleboxes, implying that traffic should be scanned only once, but against the data of all middleboxes that use the service. The DPI service then passes the scan results to the appropriate middleboxes.

Having DPI as a service is advantageous in performance, scalability, robustness, and as a catalyzer for innovation in the middlebox domain. Moreover, current Software Defined Networks (SDN) technologies and solutions make it feasible to implement such a service and route traffic to and from its instances. It is noted that according to embodiments of the present invention the DPI, as a critical building block, will be a service for the middleboxes but would be placed in the same network.

Specifically, embodiments of the present invention focus on Deep Packet Inspection (DPI), where the payload of packets is inspected against a set of signatures. DPI is a common task in many middleboxes such as Network Intrusion Detection Systems (NIDS), L7 Firewalls, L7 Load-Balancers, Policy Control and Charging Servers, Traffic Shapers, and Monitoring Devices. In many of these devices, DPI is the most time-consuming task and it may take most of the middlebox processing time. 1 Thus, great effort was invested over the years in optimizing it.

Embodiments of the present invention provide the following positive properties that enhance network performance and flexibility:

Superior throughput and memory footprint: Suppose that the DPI service is responsible for scanning traffic for n middleboxes, each with a different pattern set Pi. Embodiments of the present invention present a simple algorithm, based on deterministic finite automaton, that shows that the time to scan the traffic against all patterns (namely, Si Pi) is almost as low as scanning the traffic against a single pattern set. This implies that one may get a significant improvement in throughput, even when n=2. Scanning against all pattern-sets has also space advantage (namely, the memory footprint required to store the data structure representing the pattern set): We show that combining pattern sets is more compact than dealing with each set separately, as patterns in different sets usually share common prefixes.

Resource sharing and scale-out: Multiplexing traffic from several middleboxes to a single DPI service is appealing in times where the network is underutilized or when the peak times differ between the middleboxes. Moreover, having DPI as a virtualized service, whose instances may be deployed on demand, is beneficial in likely situations where workloads vary over time.

Robustness and security: As a central component, DPI engines are a preferred target for denial-of-service attacks. Recent works show that DPI components within the Network Intrusion Detection System (NIDS) expose the entire system to attacks that may knock down the device. Having DPI as a service is especially appealing in this case, since a developer should focus on strengthening the DPI only at a single implementation, rather than tailoring the security solution for each middlebox that uses DPI. Furthermore, as most DPI solutions nowadays use software, one can easily deploy more and more instances of the DPI to servers across the network, and by that mitigate attacks and unintentional failures.

Innovation in the middlebox domain: it is believed that providing a DPI service with clear interfaces will be a catalyzer for new kinds of middleboxes or added functionalities to existing ones, as developers would not have to deal with implementing DPI engines. As the DPI tasks are often time and resource consuming, typically lots of time and effort are invested on DPI optimizations and verifications. Moreover, when consolidating DPI to a single piece of software, one might find it beneficial to implement more advanced DPI functionalities, such as dealing with compressed traffic, or use special hardware accelerators.

Leveraging traffic locality: As in the suggested framework many DPI service instances will be deployed over the network, each of them handling a fraction of the traffic (but for many middleboxes), it is expected that in many cases there will be repetitions in traffic due to locality (e.g., traffic originating from the same network). Embodiments of the present invention provide a novel algorithm that may be incorporated within the DPI service, so that one may leverage such repetitions, skip already-scanned data, and by that boost the performance of the DPI service. It is noted that the suggested algorithm is agnostic to the middlebox using the DPI service, and therefore, may be implemented in any instance whose inspected traffic is highly repetitive.

Interplay with the data plane: it is noted that SDN implementations (e.g, OpenFlow) support forwarding (or dropping) packets by their headers. Hence, one may use SDN support to distinguish between different DPI instances, such that each instance would handle only a certain traffic type (e.g., by destination port) or traffic destined for certain sub networks. With this differentiation, specific DPI service implementation may be used for each traffic type, thus further improving its performance.

The contribution of embodiments of the present invention is two-folded. First, a possible framework of having DPI deployed as a service is detailed, including the necessary algorithms and required adaptations. Second, the superior performance of the suggested design is demonstrated via simulations. Since the focus is on the algorithmic aspects and network design, an SDN implementation of the suggested design is not provided herein. However, many aspects of such an SDN implementation follow closely the guidelines known in the art.

It should also be noted that embodiments of the present invention deals mostly with orthogonal issues of the algorithmic aspects of benefiting from virtualizing DPI. Similarly, DPI optimizations and accelerations are orthogonal to embodiments of the present invention, as they may be applied as a part of the DPI service, for further acceleration. Multicore optimization may also benefit from having DPI as a service, as instead of splitting the work between cores, one may split the work among instances running over different machines.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

Examples illustrative of embodiments of the invention are described below with reference to the figures attached hereto. In the figures, identical structures, elements or parts that appear in more than one figure are generally labeled with the same number in all the figures in which they appear. Dimensions of components and features shown in the figures are generally chosen for convenience and clarity of presentation and are not necessarily shown to scale.

FIG. 1A is a high level schematic block diagram illustrating a system according to the prior art;

FIG. 1B is a high level schematic block diagram illustrating a system according to the present invention;

Figure 2:
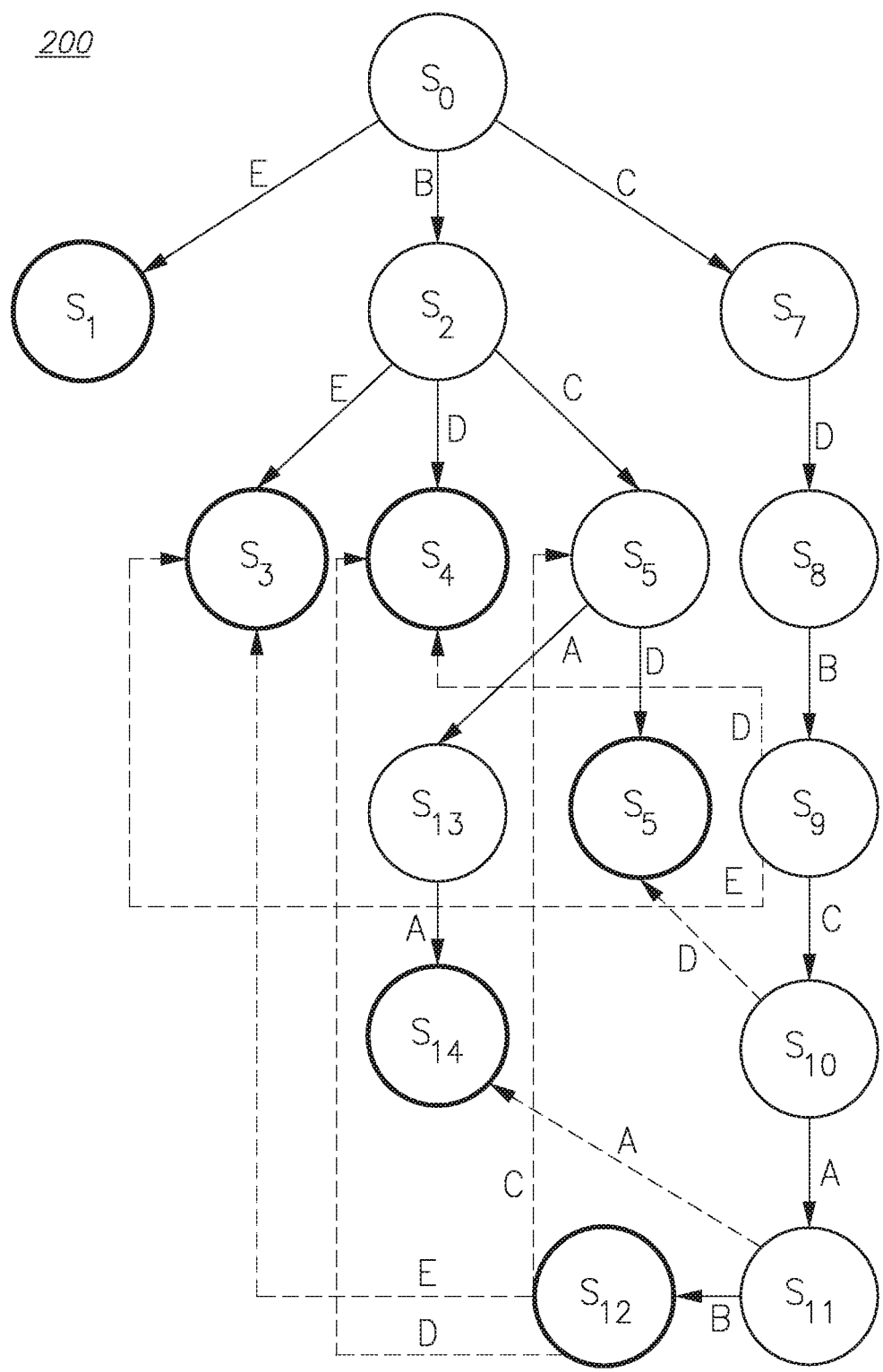
FIG. 2 is a state diagram illustrating an aspect according to some embodiments of the present invention.

The drawings together with the following detailed description make the embodiments of the invention apparent to those skilled in the art.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
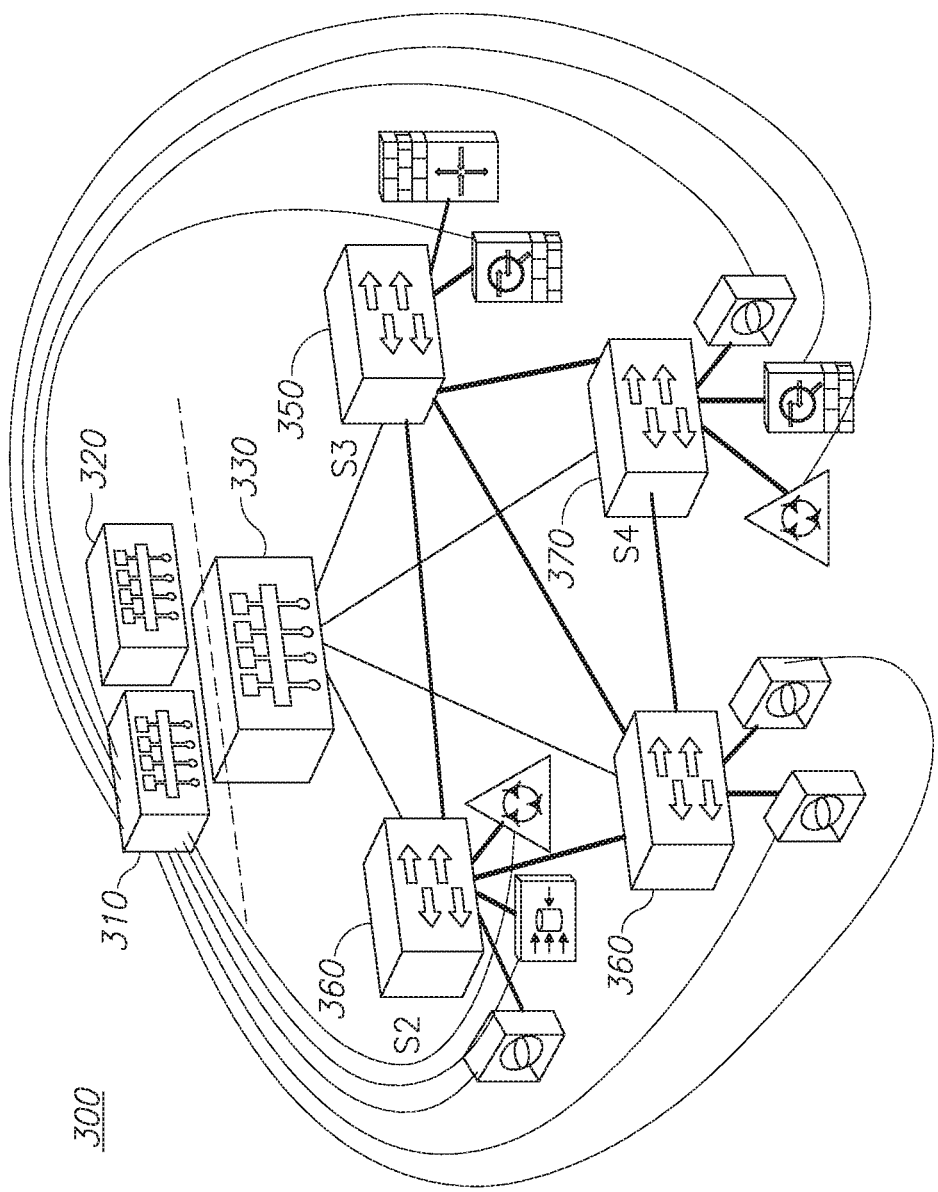
FIG. 3 is a block diagram illustrating the architecture of a system according to some embodiments of the present invention.

Following is a detailed description of the underlying architecture that supports DPI as a service. The main idea is to insert the DPI service in the middleboxes chain prior to any middlebox that requires DPI as illustrated in FIG. 1B. The DPI service module 11B scans the packet and logs all detected patterns as meta-data to the packet. As the packet is forwarded, each middlebox on its route retrieves the DPI scan results instead of performing the costly DPI task. It is assumed operating in an SDN environment with a Traffic Steering Application (TSA) that attaches policy chains to packets and routes the packets appropriately across the network. Naturally, the suggested solution will negotiate with the TSA, so that policy chains are changed to include DPI as a service as in FIG. 1B FIG. 3 is a block diagram illustrating the architecture of a system 300 according to some embodiments of the present invention. The DPI service scalability is important since DPI is considered a bottleneck for many types of middleboxes. Therefore, it is envisioned that DPI service instances will be deployed across the network. The DPI controller 310 is a logically centralized entity whose role is to manage the DPI process across the network which consists of switches S1-S4 and their corresponding middleboxes, and to communicate both with the SDN controller 330 and the TSA 320 to realize the appropriate data plane actions.

Logically, the DPI controller 310 resides at the SDN application layer on top of the SDN controller 330. The first task of DPI controller is to register middleboxes that use its service. Specifically, when a middlebox registers itself to the DPI service (through a direct communication channel), it first negotiates a unique identifier with the DPI controller. Each middlebox type has a unique identifier; namely, all middleboxes that use the same pattern set share the same identifier. Each middlebox type is registered as either a stateful middlebox, in which the packet should be scanned at the context of its flow, or a stateless middlebox, in which each packet is scanned by itself. Furthermore, the DPI service supports inspection of a flow (or a packet) prefix instead of its entire content. The inspection limit is usually determined by a cap on the number of scanned bytes (e.g., Snort's default cap is 65 KB per flow), or by a pattern match (e.g., the end of an application layer header). The stopping condition is also stored along with the middlebox identifier.

The core information that is passed between the middlebox and the DPI controller 310 upon registration is a set of patterns (e.g., regular expressions and/or strings), such that each pattern has its own unique identifier. It should be noticed that, abstractly, middleboxes operate by rules that contain actions and conditions that should be satisfied to activate the actions. Some of the conditions are based on patterns in the packet's content.

The DPI service responsibility is only to indicate appearances of patterns, while resolving the logic behind a condition and performing the action itself is the middlebox's responsibility.

The DPI controller 310 also receives from the TSA 320 the relevant policy chains (namely, all the sequences of middlebox types a packet should traverse). It assigns each policy chain a unique identifier that is used later by the DPI service instances to indicate which pattern matching should be performed.

Finally, the DPI controller is also responsible on initializing DPI service instances, deployment of different DPI service instances across the network, and advance features that require network-wide view.

Passing Information to and from a DPI

As was mentioned earlier, the pattern matching results are passed as a meta-data of the packets. In fact, there are two tasks that should take place. First, for each specific packet, one should inform the DPI service instance what are the middleboxes that should be served. Second, after scanning the packet, the DPI service instance should pass its results to the corresponding middleboxes.

As for the former consideration, the TSA has a unique identifier for each of its policy chains, which determines exactly the relevant middleboxes for the service instance.

Thus, using SDN capabilities (and specifically, OpenFlow) the TSA instructs the last switch before the DPI instance to add the appropriate policy chain identifier to packets as a VLAN tag, just before passing the packet to the DPI instance.

The second task of passing the pattern matches requires adding meta-data to the packet itself, and should take into account the following three considerations: First, it should be oblivious to the switches and not interfere with forwarding the packet through the chain of middleboxes and then to its destination. Second, the meta-data is of a variable size as the number of matches varies and is not known in advance.

Third, the process should be oblivious to middleboxes (and hosts) that are not aware of the DPI service. Having these considerations in mind, four solutions that may fit to different network conditions are suggested in accordance with embodiments of the present invention:

- Adding an L7 header prior to the payload. The advantage is that all L2-L4 headers remain without a change (and therefore are oblivious to the switches along the way) and that full control on its structure is gained, and therefore, variable size can be easily supported. On the other hand, all middleboxes on the packet's path should be aware of the header; furthermore, the last middlebox that uses the DPI information should remove this data from the packet. One way to realize this is to group together all middleboxes that uses DPI in the policy chain, immediately after traversing the DPI service.
- Using the options field in the TCP header. This method is supported in current networks but is limited to 320 bits, which might not suffice in some cases.
- Using some flexible pushing and pulling of tags (e.g., MPLS labels, VLAN tags, PBB tags). This method is supported in current OpenFlow-based SDN networks. Still, it might be messy as each matching result may require several such tags and the tags added by the DPI service must not collide with other tags used in the system.
- Using Network Service Header (NSH). The recently suggested NSH provides the maximum flexibility by adding several service headers to the packet.

However, it requires some kind of an encapsulation (such as GRE or MPLS), which is not supported by every network. Furthermore, NSH defines the concept of service chains, which are similar to policy chains, and forwards packets by specific field in the NSH header. NSH is implemented by Cisco's vPath, which also seems to work in SDN setting.

It is noted that a completely different approach is to signal the matching results directly to each relevant middlebox. However, this method is not recommended as it breaks the flow order within the network and might result in synchronization problems and performance degradation.

Deployment of DPI Service Instances

The DPI controller abstracts the DPI service for the TSA, SDN controller, and the middleboxes. Hence, one of its most important tasks is to deploy the DPI instances across the network.

There might be many considerations for such deployment some of which are detailed as follows:

First, it is emphasized that not all DPI instances need to be the same. Thus, a common deployment choice is to group together similar policy chains and to deploy instances that support only one group and not all the policy chains in the system. The DPI controller will then instruct the TSA to send the traffic to the right instance. Alternatively, one might group the middlebox types by the traffic they inspect. For example, sets of patterns that correspond to HTTP traffic may be allocated to some DPI service instances, while a set of patterns that corresponds to FTP is allocated to other DPI service instances.

Additionally, the DPI controller should manage the DPI instances' resources, so that an instance is not overwhelmed with traffic, and therefore, performs poorly. Thus, the DPI controller should collect performance metrics from the working DPI instances and may decide to allocate more instances, to remove service instances, or to migrate flows between instances.

It is noted that, in general, performing operations on the DPI service instances rather than the middleboxes themselves is easier as most of the flow's state is typically kept within the middlebox, while the DPI instance keeps only the current DFA state and an offset within the packet.

Finally, it is noted that allocation, de-allocation, and migration affect the way packets are forwarded in the network. Thus, the DPI controller should collaborate with the TSA (and the SDN controller) to realize the changes and take into account other network considerations (such as bandwidth and delay).

The ability to dynamically control the DPI service instances and to scale out provides the DPI controller great flexibility, which can be used for powerful operations.

DPI Service Instance Implementation

The implementation of a DPI service instance is discussed herein. At the core of the implementation, a virtual DPI algorithm that handles multiple pattern sets is presented. The initial focus is on string matching and then extends it to handle regular expressions.

Initialization

First, it is shown how to combine multiple pattern sets, originating from different middleboxes such that each packet is scanned only once.

As detailed above, each middlebox type has a unique identifier and it registers its own pattern set with the DPI controller.

As the DPI controller is a logically-centralized entity and is the one that allocates the identifiers, we may assume identifiers are sequential numbers in $\{0, \ldots, n\}$, where n is the number of middlebox types registered to the DPI service.

Let Pi be the pattern set of middlebox type i. Upon instantiation, the DPI controller passes to the DPI instance the pattern set, the corresponding middlebox identifiers, the stopping condition of each middlebox, and whether the middlebox is stateless (scans each packet separately) or stateful (considers the entire flow). Moreover, it passes the mapping between policy chain identifiers and the corresponding middlebox identifiers in the chain.

Our simple algorithm works in two steps. First, we construct the AC automaton as if the pattern set was Si Pi. It should be noted that the number of accepting states in the resulting DFA, denoted by f, is |Si Pi|, as there is an accepting state for each pattern, no matter if it is originating in one or more middlebox.

Furthermore, it should be noted that the state identifier in the DFA is meaningless. This degree of freedom is used and map the identifiers of the accepting states to the range $\{0, \ldots, f\}$; this will make the resolution stage for matched patterns more efficient in terms of time and space.

The second step is to determine, for each accepting state, what are the middleboxes that have registered the pattern and what is the identifier of the pattern within the middleboxes' pattern set. This is done by storing a pre-computed direct-access array match of f entries such that its $i^{th}$ entry holds the information corresponding to the pattern of accepting state i, as a sorted list of h middlebox id, pattern idi pairs. It is important to notice that if we have a pattern i (e.g., DEF) that is a suffix of another pattern j (e.g., ABCDEF), one should add all the pairs corresponding to pattern i also to the $j^{th}$ entry.

Furthermore, traditional DFA implementations mark accepting state using one bit; when n is relatively small, it is beneficial to mark the accepting state by a bitmap of the middlebox identifiers in its corresponding list; in such a case, a simple bitwise-AND operation can indicate if we need to check the table at all, or may continue scanning the packets, since the matching pattern is not relevant to the packet.

We also store in a separate table the mapping between a policy chain identifier and the corresponding middlebox identifiers. Another table holds the mapping between a middlebox identifier and its properties (namely, its stopping condition and whether it is stateless or stateful). Finally, if at least one of the middleboxes is stateful, we will initialize an empty data structure of active flows, which will hold the state and offset of scans done on that flow up until now.

Figure 4:
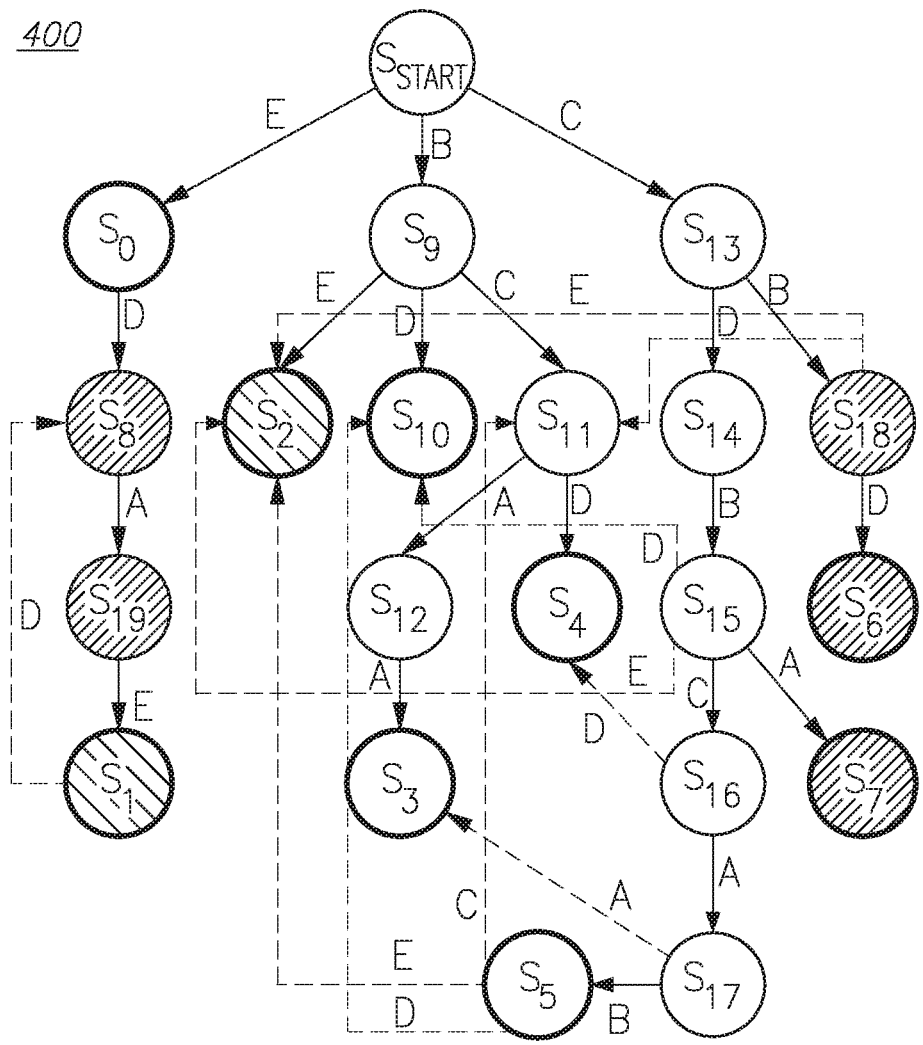
FIG. 4 is a state diagram illustrating yet another aspect according to some embodiments of the present invention.

FIG. 4 is a state diagram illustrating an example of the resulting DFA and the match table is depicted in. The DFA and match table for P0={E,BE,BD,BCD, BCAA,CDB-CAB} (as in FIG. 2) and P1={EDAE,CBD,CDBA,BE}. Added states are marked in gray. White accepting states are marked with bitmap 10, gray accepting states with bitmap 01, and striped accepting states with bitmap 11. Non-forward transitions to s start, s0, s9, and s13 are omitted for brevity.

Packet Inspection

Recall that packets should be compared with several (but, in general, not all) pattern sets, where the relevant identifiers are marked on a VLAN tag at the packet header. Hence, upon packet arrival, the DPI service first resolves (using the mapping saved in the initialization phase) what are the relevant middlebox identifiers (we shall call them the active middleboxes for the packet). Moreover, the stopping condition for the packet is determined as the most conservative condition among all active middleboxes, an empty matchlist for each active middlebox is being initialized, as well as a global counter variable cnt (which counts the number of bytes scanned so far). When n is sufficiently small, a bitmap of size n is constructed such that the ith bit is set if and only if middlebox i is active.

Finally, if the packet is a part of a flow that is already being scanned and its DFA state is stored, that state is being restored and the offset is stored in another variable, called offset (otherwise, offset=0). Then, the packet is scanned against the combined DFA, while maintaining the value of cnt. When reaching an accepting state j, the bitmap of the packet is compared against the bitmap stored at the state; if a match is found then all pattern identifiers corresponding to active middleboxes in match[j] are added to the corresponding match-lists, along with the value of cnt. In the end of the scan, irrelevant matches are deleted from the match-lists: For stateful active middleboxes, a match is deleted if the value of cnt+offset exceeds the stopping condition of the specific middlebox.

For stateless middleboxes, in which the packet scan should have started at start but instead started at the restored state for the stateful middleboxes, we delete patterns whose length is smaller than their value of cnt, as well as patterns whose stopping condition is smaller than the value of cnt.

After the packet scan is finished, the match-lists are sent to the corresponding active middleboxes as described above; along with the pattern identifier we pass the value of either cnt (for stateless middleboxes) or cnt+offset (for stateful middleboxes). If at least one active middlebox is stateful, the state of the DFA in the end of the scan is recorded and offset is incremented by cnt.

Dealing with Regular Expressions

As explained above an approach similar to the one implemented in Snort NIDS has been taken and string matching process is used as pre-filtering for regular expression matching. Specifically, for each regular expression, we first extract sufficiently long strings (which we call anchors) within the regular expression that must be matched for the entire regular expression to be matched; short strings of length less than 4 characters are not extracted. For example, in the regular expression "regular\s*expression\s*\d+", the anchors "regular" and "expression" are extracted. We add the anchors extracted from the regular expressions of middlebox I to pattern set Pi. In addition, we hold a mapping between the regular expression and its anchors. The packet is scanned as before (with the DFA obtained by the new pattern set).

Upon completion, it is checked if there are regular expressions of an active middlebox for which all anchors were found. If there are, an off-the-shelf regular expression engine (e.g., PCRE) is invoked on these regular expressions (one by one). Otherwise, no further operation is needed.

Finally, it is noted that sometimes there are middleboxes whose regular expressions contain almost no anchors (or, alternatively, very short anchors). In such a case, a regular expression matching algorithm is used, and run it in parallel to our string matching algorithm.

Experimental Results

In the reminder of the application several experimental results illustrating the performance of the virtual DPI algorithm in accordance with embodiments of the present invention will be discussed.

The tests were performed on a machine with Intel Sandybridge Core i7 2600 CPU, quad-core, each core has two hardware threads, 32 KB L1 data cache (per core), 256 KB L2 cache (per core), and 8 MB L3 cache (shared among cores). The system runs Linux Ubuntu 11.10, on which we run one or more instances of a Linux Ubuntu virtual machine using VMWare Player. Pattern sets from Snort (up to 6,192 patterns) and Clam-AV (33,024 patterns) were used. As input traffic, a trace of HTTP traffic from most popular websites were used.

Virtual DPI Performance

Table 2: Comparing the performance of two DPI machines, one running on patterns set of Snort1 and the other on patterns set of Snort2, to one virtual DPI with the combined pattern sets of Snort1 and Snort2.

Figure 5:
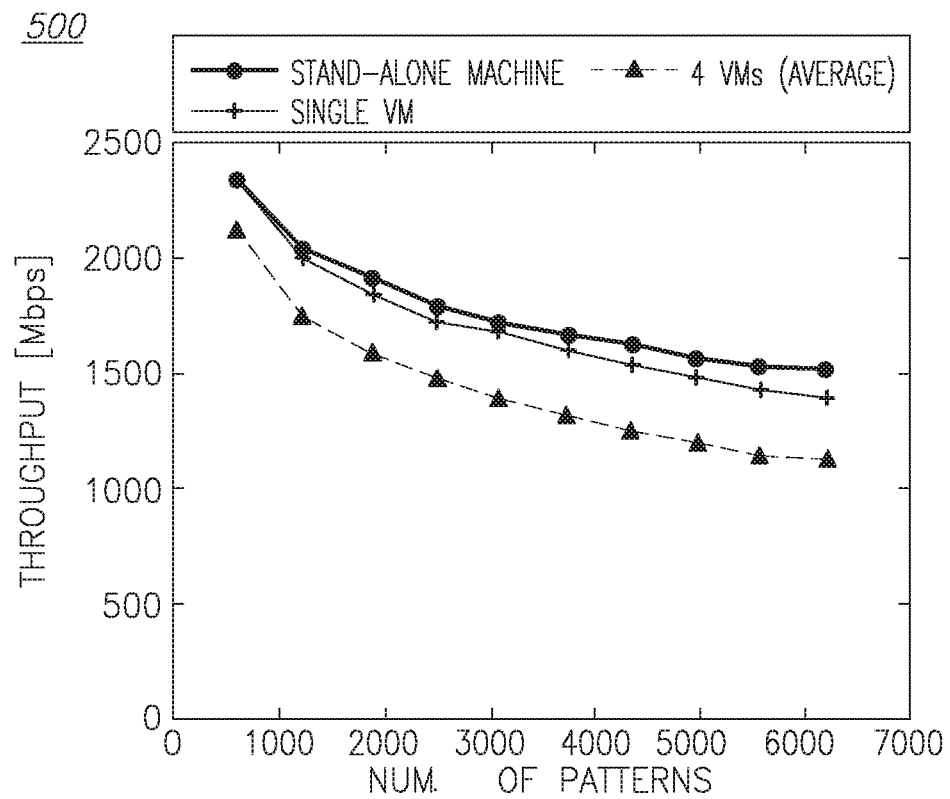
FIGS. 5, 6, 7A, 7B, 8A, 8B, 9A, and 9B are graph diagrams of various simulation results illustrating the performance of the system and method according to some embodiments of the present invention.

As a first step, we evaluate the impact of the virtualization environment on DPI in order to reassure that DPI is suitable to run as a VM. This test is done on the original AC algorithm (and not the virtual DPI algorithm of the present invention). Three different scenario were run: first, when the DPI runs on a standalone machine; second, when the DPI runs on a VM while other cores are idle; third, when four instances of the DPI are running, each of them on a separate VM that uses a separate core (such that they occupy all cores of the machine), and throughput is calculated as the average throughput of the four cores. The tests were done for different number of patterns. FIG. 5 shows that virtualization has a minor impact on throughput of the DFA. However, the number of patterns has a major impact on the throughput. From here on, we would focus on running our virtual DPI algorithm as an instance, where the instance runs on a VM in all our experiments.

In order to understand the performance of our virtual DPI algorithm, we run a regular DPI engine, and compare its throughput with a given number of patterns in the cases when the patterns of the virtual DPI are from one or more set of patterns (and thus the virtual DPI reports to one or more middleboxes).

Figure 6:
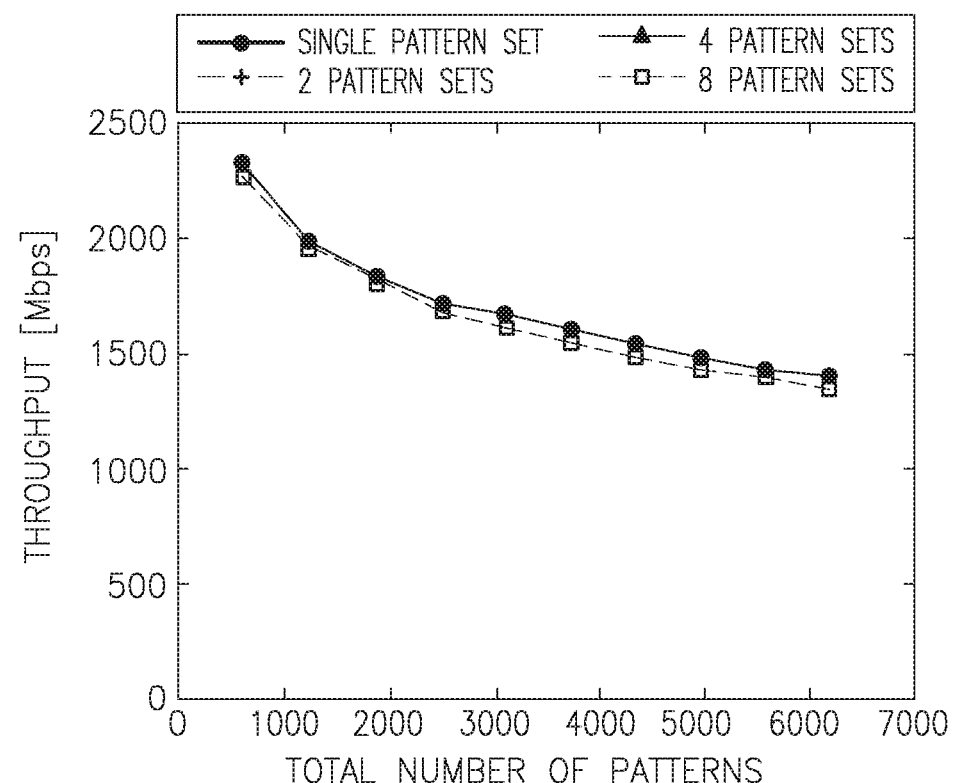

FIG. 6 shows the results. We see that the overload of our virtual DPI is small (less than 14%). The number of middleboxes that are responsible for the total set of patterns has a minor influence on the performance. The key number that affects the performance is the number of patterns.

Comparison to Different Middlebox Configurations

In order to evaluate the saving of the mechanism according to embodiments of the present invention patterns of Snort and were randomly divided them into two sets, named Snort1 and Snort2, simulating a configuration where we have two stand-alone DPI machines Snort1 and Snort2. It was demonstrated that the virtual DPI solution saved 5% of the memory requirement.

This is due to the fact that head of the DFA (namely, the states whose depths are small) is similar in the two separate DFAs of Snort1 and Snort2. The throughput of the combined machine is just 11% less than that of each of the separate machine. As we previously showed, this is mainly due to the impact of the number of patterns.

To understand the gain from the virtual DPI two scenarios were simulated: in the first scenario, traffic should go through two instances of DPI, one with pattern set A and the other with pattern set B (for example, Snort1 and Snort2, or full Snort and ClamAV). In the second scenario, there are two types of traffic: one should be handled using a DPI machine with pattern set A and the other using a DPI machine with pattern set B. In both cases we compare the naïve solution of two instances, where each instance runs the DPI with different sets of patterns (A or B) to the case of using two instances of our virtual DPI solution.

Figure 7A:
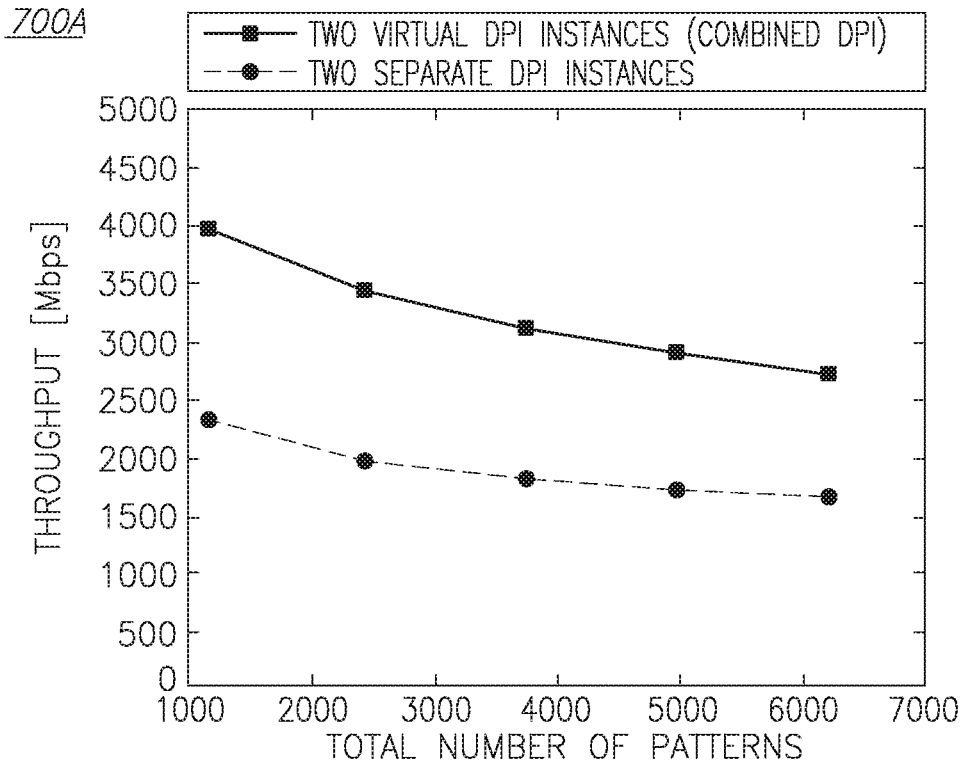
Figure 7B:
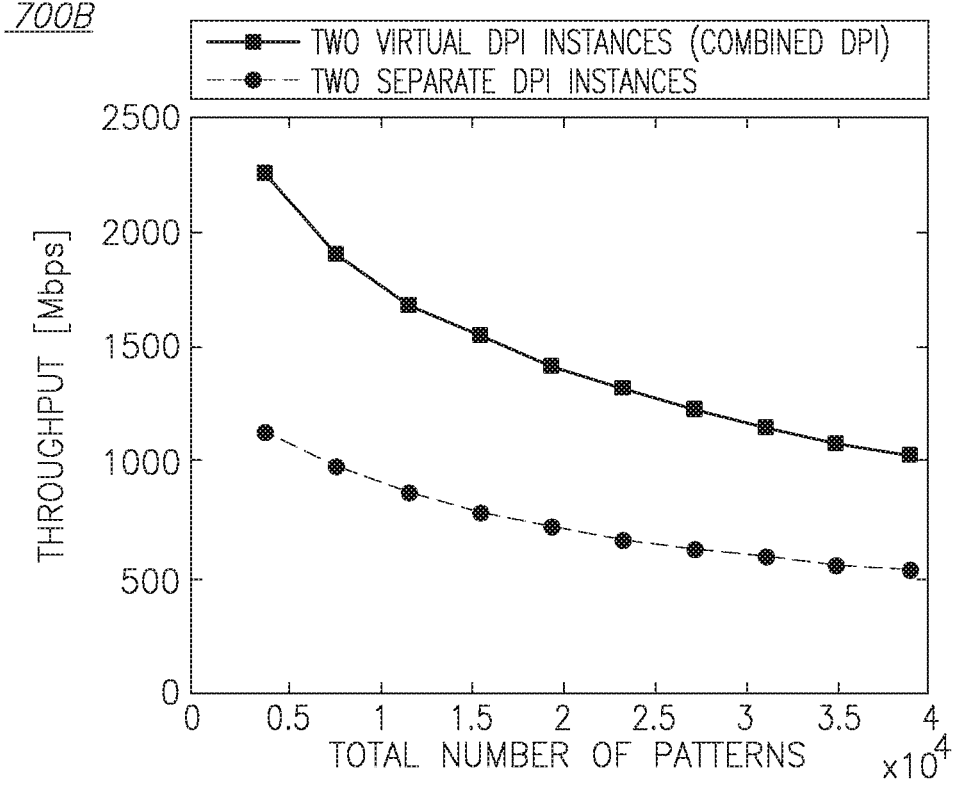

FIGS. 7A and 7B show the throughput in the first scenario and compare it to a setup of two virtual DPI instances that run on both machines simultaneously, where load is equally distributed between them. It is clear that our virtual DPI solution is at least 63% faster in the first case, and more than 90% faster in the second case.

Figure 8A:
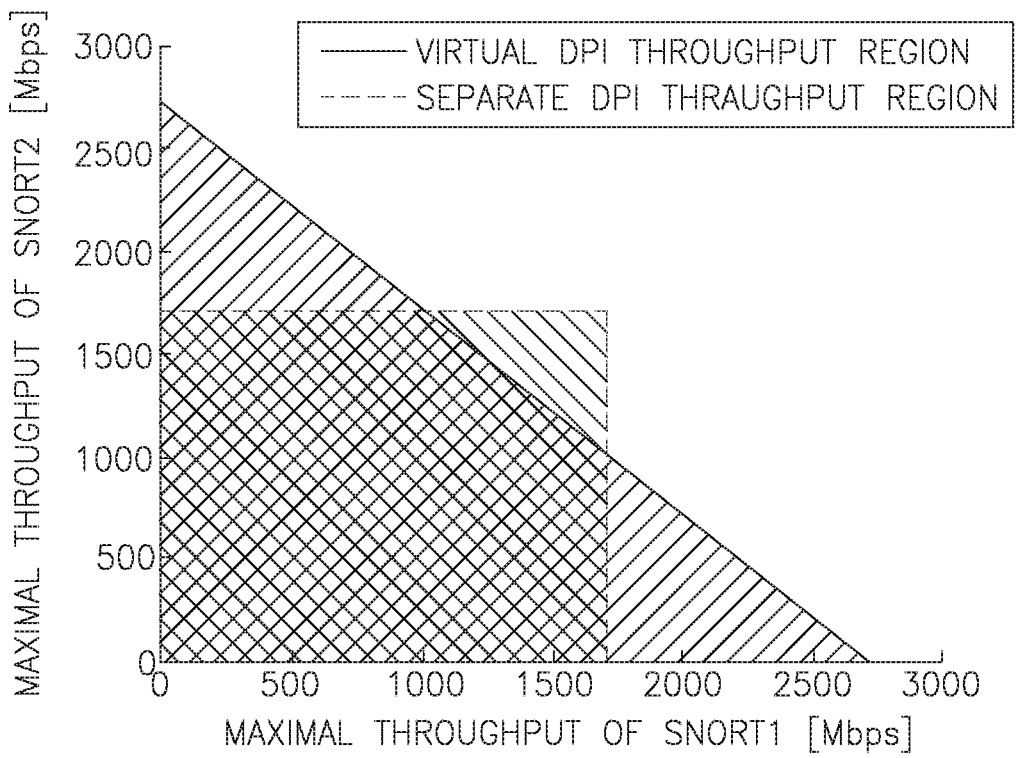
Figure 8B:
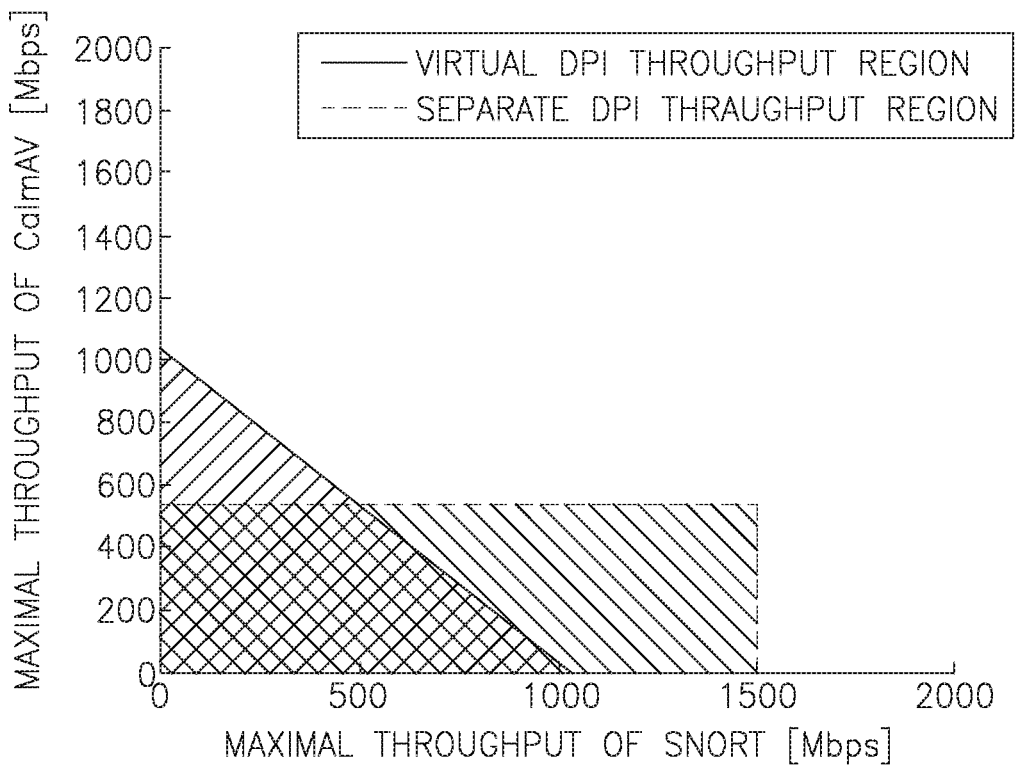

FIGS. 8A and 8B evaluate the saving in the second scenario. The dashed rectangle is the throughput region of traffic that the naïve DPI solution can handle, given that each pattern set is handled by a single DPI machine. The triangle is the throughput region that our virtual DPI solution can handle, given that both machines run our virtual DPI.

Reference is made to two such middleboxes as appear in FIG. 8A. The motivation to use virtual DPI in this scenario is that most of the time not all middleboxes handle full load, and thus combined virtual DPI machines could make use of free resources from one middlebox to provide higher capacity for another middlebox. This can be seen in the figure as the areas inside the triangle but outside the rectangle.

Since the size of the DFA is a dominant factor for performance, this approach is beneficial when the relative size of the pattern set correlates with the relative gain it could have (according to the triangle in the figure). For example, in FIG. 8B, it would be beneficial to combine Snort (which has a moderate number of patterns) and ClamAV (which has much more patterns) in the second scenario only if Snort does not usually exceed 69% load (as triangle's hypotenuse meets x-axis at 69% of rectangle's width) and ClamAV usually does face high loads. In such cases, ClamAV could actually exceed 100% of its original capacity without adding more resources. The DPI controller should take these considerations into account when deciding whether to combine two DPI instances in this scenario.

Enhancing Robustness and Security

DPI engines, as a core building block of many security appliances, are known to be the target of attacks. Recently-suggested architecture, called MCA2, mitigates such attacks by deploying several copies of DPI engines over multiple cores of the same machine. The key operation of MCA2 is to detect and isolate the heavy packets that cause the degraded performance, and divert them to a dedicated set of cores. Moreover, the dedicated cores may run a different AC implementation that is more suitable to handle this kind of traffic. MCA2 can be implemented as-is in each DPI service instance, provided it runs on a multi-core machine. In addition, our architecture may implement MCA2, while scaling out to many DPI service instances. As in the original MCA2 design, each DPI service instance should perform ongoing monitoring and export telemetries that might indicate attack attempts. In the MCA2 design, these telemetries were sent to a central stress monitor entity. Here, the DPI controller, takes over this role. Whenever the DPI controller detects an attack on one of the instances, it forwards the heavy flows, which are suspected as malicious, to dedicated DPI instances (that might use a different AC implementation). This procedure is performed using flow migration as described in Section 4.3. We note that in such a case, a close cooperation with the traffic steering application is required.

Leveraging Traffic Repetitions

In some embodiments DPI can leverage from repetitions in traffic. Since in our system each DPI service instance inspects only a fraction of the traffic (but for many middleboxes), we expect that in many cases there will be more repetitions in traffic than current deployment when DPI is performed for the entire traffic traversing a middlebox. The amount of repetitions at a specific instance can be increased intentionally by the DPI controller, which is able to forward specific traffic to specific service instance. Thus, the controller can group together similar traffic (e.g., by locality properties such as source and destination or by protocol) and send it to the same service instance.

At the heart of embodiments of the invention is an enhancement for the Aho-Corasick algorithm to allow skipping previously-scanned bytes; these bytes are saved in a dictionary along with some auxiliary information.

Enabling Skips within the Execution of the Aho-Corasick Algorithm

To enable skipping repetitive data, we add to the Aho-Corasick algorithm an auxiliary dictionary that contains (popular) strings. Following is an explanation how dictionaries are created, and how they are accessed from the data-path. In this section, we show the correctness of this enhancement to the Aho-Corasick algorithm: that is, no patterns are missed due to byte skips.

Scanning the Dictionary

We assume that the dictionary is a set of strings of k bytes, which we call k-grams. For each string, separately, we initiate an Aho-Corasick scan from the initial state s0. The dictionary holds the state at the end of the scan (along with the string). If a match was found by the end of the scan, we may either store a pointer to the matched pattern or, in the case of a low match rate, we may just remove the string from the dictionary (namely, to avoid dealing with rare situations in which one of the pattern is a substring of a popular k-gram).

Scanning the Data

When scanning a byte, the algorithm checks whether it can skip subsequent bytes using one of the strings in the dictionary.

More formally, let $b_1, \ldots, b_n$ denote the data; when scanning byte $b_i$, the algorithm checks whether the string $x = b_i, \ldots, b_{i+k-1}$ is in the dictionary. If it is, the algorithm proceeds as follows: First, note that we need to be careful not to miss a signature that starts before $b_i$ and ends after $b_i$ (namely, it crosses the left margin of the k-gram x). To cope with this situation we perform a left-margin resolution: We start scanning the bytes $b_i, b_{i+1}, b_{i+2}, \ldots, b_{i+k-1}$ one by one, until scanning some byte $b_{i+j}$ results in state whose depth is less or equal to j. In this case, Property 1 of the Aho-Corasick algorithm yields that any pattern that ends after $b_{i+j}$ must start after $b_i$ (namely, within or after the skipped k-gram x).

Next, a pattern match within the k-gram x is reported if h and m denote dictionary hit and dictionary miss, respectively. The third row is the state after scanning the character, while the fourth row is the state's depth. Finally, the last row gives the value of j that is used for left-margin resolution. such a match is stored in the dictionary along with x. Finally, in any case, the algorithm transits to the state that was saved along with x and continues scanning byte $b_{i+k}$; naturally, the last two steps occur only if byte $b_{i+k-1}$ was not reached during the left-margin resolution.

The correctness of the algorithm stems from the fact that after skipping a string x, the algorithm transits to the same state as if x was scanned byte by byte. In addition, we need to ensure that if some pattern is detected when x was scanned byte by byte, it will also be detected in our algorithm. This is captured by Theorem 1. Notice that this theorem assumes that there are no patterns which are fully contained in x; as such patterns are explicitly stored in the dictionary, it is straightforward to extend the theorem also for this case.

Incorporating the Algorithm within the DPI Service

In order to incorporate the above Aho-Corasick enhancement we need to add mechanisms for maintaining a dictionary (on a slow path) and looking up k-grams in the dictionary (which lies on the data path).

The Slow Path

The slow path is responsible of creating a dictionary of frequent k-grams, scan the saved k-grams as we explained before, and save the DFA state at the end of this scan.

It is noted that while the dictionaries used herein aim to store the most popular k-grams, they suffer from inherent inaccuracies, which sometime reduce the performance gained by our mechanisms; our experiments show, however, that these inaccuracies are not significant. Naturally, the most important reason for such inaccuracies is that the dictionary is built on offline slightly outdated data. In addition, in a virtual environment, the slow path runs on another VM and gets only samples of the packets.

It is noted that the heavy-hitter algorithm works in a sliding window and stores all popular k-grams. However, this results in a dictionary pollution, in which m−k+1 substrings of length k of a very popular string of length m are stored in the dictionary, while our mechanism never access all but m/k of them.

The resulting dictionary may be stored as an open hash table, where colliding keys are chained. Keys are added in the order of popularity, such that the most popular key is first in the chain, to improve lookup time on average.

The Data Path

The data path uses a sliding window of length k to extracts k-grams from the data. For each k-gram, the algorithm searches the dictionary and retrieves the corresponded entry, in case a match is found. If there is no match, one byte is scanned with the Aho-Corasick algorithm, the window slides one byte and the process repeats itself with the next k bytes of the data. If there is a match, left margin resolution is performed. Then, the data path adjusts its state to the stored state in the corresponding dictionary entry and advances to the end of the k-gram. Namely, if the k-gram has started in i-th byte of the traffic, the next byte to be scanned will be the (i+k)-th one.

Since the dictionaries might not reside in fast memory or cache, and therefore, might require slower access operations, we first query a bloom filter to ensure that the gram is in the dictionary. Bloom filters are a compact set representation (in our case, the set is all the grams in the dictionary) that enable efficient approximate set membership queries; thus, in case, the gram is not in the dictionary, the overhead of our mechanism is reduced by one order of magnitude. It is noted that bloom filters sometimes generate false positives, which in our case implies redundant access to the dictionary; this only results in a performance penalty as the dictionary-miss is detected immediately afterwards.

Since the false positive rate is very small, this performance penalty is usually insignificant.

Performance Evaluation

In an experiment, the enhancement for the Aho-Corasick algorithm was implemented. In our experiments we limit the number of k-grams in the dictionary to about 45,000. We found that in most cases, this is enough to achieve high skip ratio while keeping the dictionary lookup process relatively fast. For this number of elements, we use a bloom filter with one hash function of size 0.5-1 Mbits. In our experiment the match rate is low so we omit from the dictionary strings that match patterns. For performance evaluation we use the same system described above.

Figure 9A:
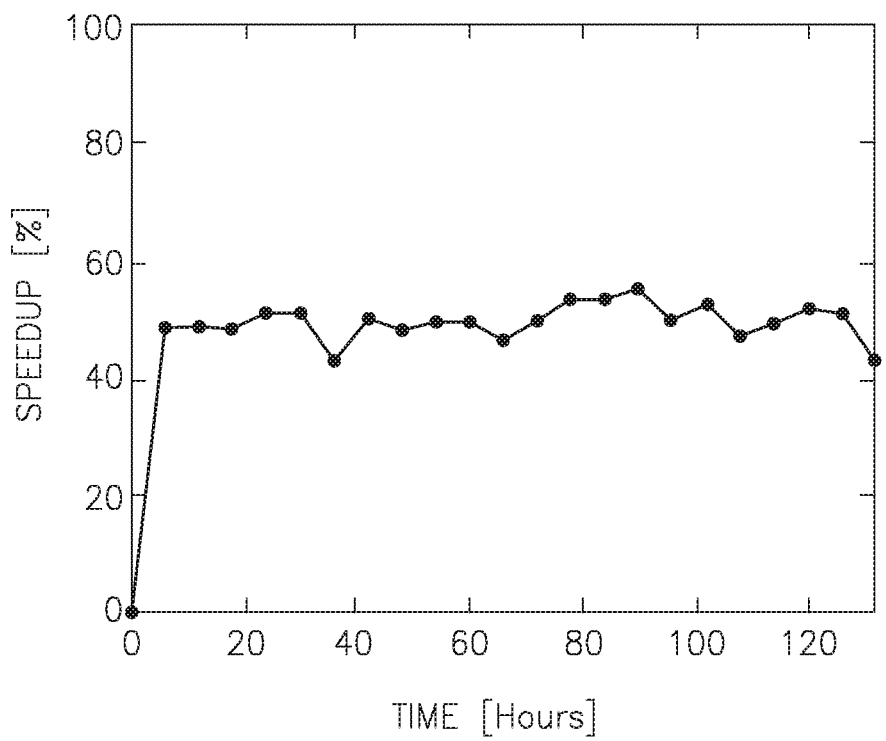
Figure 9B:
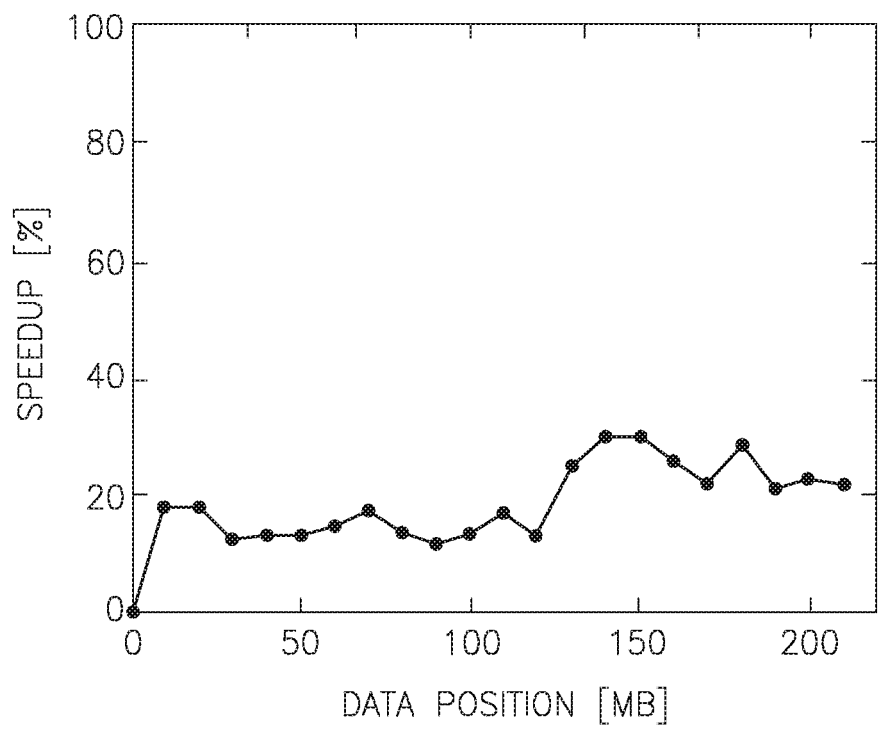

FIGS. 9A and 9B shows the actual speedup for the two different traffic traces. In experiments held by the inventors, two traffic traces and pattern sets were used in an experiment. First, YouTube website (FIG. 9A) was crawled and pages up to depth 2 were downloaded. The process was repeated every 1.5 hours to track changes in HTTP responses. For our experiments we only considered HTML content, and scan it against Snort's pattern-set of around 4,000 patterns. For the second experiment, a trace collected from a campus wireless network was used and compare against 0.5M-1M URLs from URLBlacklist.com (FIG. 9B). This case that corresponds to URL/HTTP Header Filtering limits the inspection to HTTP headers only.

Additionally, a new dictionary was computed for every 10 MB-20 MB. To assess the potential gain of our mechanism each component of the model was isolated. Times for each operation were measured separately in nanoseconds per input byte. Each operation is isolated and timed using a different timer, in separate runs. It is noted that the different components have different values with each traffic source as traffic induces different

CONCLUSION

Virtualization, NFV and SDN, promise revolution in the way middleboxes are designed and managed. We believe that common tasks among middleboxes should be provided as virtual services for enhanced performance and more flexible design. DPI is one of the heaviest tasks among those, and this paper focuses on it. In future work, we will investigate the possibility of making also other common tasks, such as TCP reconstruction, a service. Making DPI a service has implications not only on the architecture and the system design of a middlebox, but also on the algorithmic aspects of the DPI engine itself. This work presents several tailor-made algorithms to benefit from the flexibility of a virtual environment. We believe that virtualization opens the door to many more algorithms that benefit from such an environment in different ways.

Aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," and a "cloud".

The aforementioned block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for virtualizing a deep packet inspection (DPI), the method comprising the steps of:
    initializing a plurality of different middleboxes in a computer network connectable with a DPI controller which is logically separated from said middleboxes;
    establishing communication between said plurality of different middleboxes and the DPI controller over existing protocols of said computer network; and
    deploying DPI instances from the DPI controller to the middleboxes responsive to requests, by combining multiple pattern sets originating from said different middleboxes such that traffic used by more than one of said middleboxes is only scanned once by said DPI controller.

2. The method according to claim 1, wherein said initializing comprises constructing an Aho-Corasick automaton for each pattern to be scanned and determining, for each accepting state in the Aho-Corasick automaton, what are the middleboxes that have registered said pattern and what is the identifier of the pattern within the middleboxes' pattern set.

3. The method according to claim 1, wherein said communication between said plurality of middleboxes and the DPI controller is established by adding a layer 7 header prior to the payload and configuring the last middlebox that uses the DPI information to remove said layer 7 header.

4. The method according to claim 1, wherein said communication between said plurality of middleboxes and the DPI controller is established by using flexible pushing and pulling of tags.

5. The method according to claim 1, wherein said communication between said plurality of different middleboxes and the DPI controller is established by using the options field in the TCP header.

6. The method according to claim 1, wherein said communication between said plurality of different middleboxes and the DPI controller is established by using Network Service Header (NSH).

7. A system for virtualizing a deep packet inspection (DPI), the system comprising:
- a plurality of different middleboxes in a computer network connectable with a deep packet inspection (DPI) controller which is logically separated from said different middleboxes;
- a plurality of network components configured to establishing communication between said plurality of middleboxes and the DPI controller over existing protocols of said computer network; and
- a DPI controller configured to deploying DPI instances to the middleboxes responsive to requests, by combining multiple pattern sets originating from said different middleboxes such that traffic used by more than one of said different middleboxes is only scanned once by said DPI controller.

8. The system according to claim 7, wherein said middleboxes and DPI controller are initialized by constructing an Aho-Corasick automaton for each pattern to be scanned and determining, for each accepting state in the Aho-Corasick automaton, what are the middleboxes that have registered said pattern and what is the identifier of the pattern within the middleboxes' pattern set.

9. The system according to claim 7, wherein said communication between said plurality of middleboxes and the DPI controller is established by adding a layer 7 header prior to the payload and configuring the last middlebox that uses the DPI information to remove said layer 7 header.

10. The system according to claim 7, wherein the DPI controller is implemented by an Aho-Corasick algorithm that allows skipping previously-scanned bytes and stores previously-scanned bytes on a dictionary along with auxiliary information.

11. The system according to claim 10, wherein the DPI controller enables skipping repetitive data, by enhancing the Aho-Corasick algorithm with an auxiliary dictionary that contains popular strings.

12. The system according to claim 7, wherein said communication between said plurality of different middleboxes and the DPI controller is established by using the options field in the TCP header.

13. The system according to claim 7, wherein said communication between said plurality of different middleboxes and the DPI controller is established by using Network Service Header (NSH).

14. A computer program product for virtualizing a deep packet inspection (DPI), the computer program product comprising:
- a non-transitory computer readable storage medium having computer readable program embodied therewith, the computer readable program comprising:
- computer readable program configured to initialize a plurality of different middleboxes in a computer network connectable with a deep packet inspection (DPI) controller which is logically separated from said different middleboxes;
- computer readable program configured to establish communication between said plurality of different middleboxes and the DPI controller over existing protocols of said computer network; and
- computer readable program configured to deploy DPI instances from the DPI controller to the middleboxes responsive to requests, by combining multiple pattern sets originating from said different middleboxes such that traffic used by more than one of said middleboxes is only scanned once by said DPI controller.

15. The computer program product according to claim 14, wherein said middleboxes and DPI controller are initialized by constructing an Aho-Corasick automaton for each pattern to be scanned and determining, for each accepting state in the Aho-Corasick automaton, what are the middleboxes that have registered said pattern and what is the identifier of the pattern within the middleboxes' pattern set.

16. The computer program product according to claim 14, wherein said communication between said plurality of middleboxes and the DPI controller is established by adding a layer 7 header prior to the payload and configuring the last middlebox that uses the DPI information to remove said layer 7 header.

* * * * *